Aug. 10, 1965  E. W. F. RYDELL  3,199,659
BOARD HANDLING AND CONVEYING APPARATUS
Filed June 6, 1961  10 Sheets-Sheet 6

INVENTOR.
BY EDMUND W. F. RYDELL
Carlsen and Carlsen
ATTORNEYS

Aug. 10, 1965  E. W. F. RYDELL  3,199,659
BOARD HANDLING AND CONVEYING APPARATUS
Filed June 6, 1961  10 Sheets-Sheet 8

INVENTOR.
EDMUND W. F. RYDELL
BY
Carlsen and Carlsen
ATTORNEYS

Aug. 10, 1965   E. W. F. RYDELL   3,199,659
BOARD HANDLING AND CONVEYING APPARATUS
Filed June 6, 1961   10 Sheets-Sheet 9

INVENTOR.
EDMUND W. F. RYDELL
BY
Carlsen and Carlsen
ATTORNEYS

United States Patent Office 3,199,659
Patented Aug. 10, 1965

3,199,659
BOARD HANDLING AND CONVEYING
APPARATUS
Edmund W. F. Rydell, % The Rydell Company,
2328 N. 2nd St., Minneapolis 11, Minn.
Filed June 6, 1961, Ser. No. 115,125
14 Claims. (Cl. 198—165)

This invention relates to board handling and conveying devices, and more particularly to devices adapted for use in conjunction with ripsaws and the like for conveying a board or other article upon which work is being performed back to the saw for further work or away from the saw as required.

Power feed ripsaws and similar machines, such as straight-line ripsaws, chain feed glue joint or roll feed ripsaws and other woodworking machines are ordinarily operated by two men, a sawyer who adjusts the width of the cut and feeds the stock into the saw and a helper or tailboy who receives and properly disposes of the ripped stock emerging from the saw or feeds the uncut portion of the board back to the sawyer for an additional pass through the machine. It is a primary object of my invention to replace the helper or tailboy with an automatic apparatus adapted to perform the functions previously carried out by the helper.

Heretofore, equipment has been proposed for use in conjunction with ripsaws and similar tools in which the output of the saw or other tool slides down a ramp and onto a conventional conveyor belt which conveys this material back to the sawyer. Other prior devices provide conveyors running at right angles to the path of the work through the saw to perform the same function as the ramp. A number of disadvantages are, however, encountered in these prior art devices. One of the disadvantages is that the board or other material being worked upon is returned to the sawyer relatively slowly. Thus, while the sawyer may have in mind a particular pattern of cuts he intends to make between the knots and defects in order to get the best yield of clear cut lumber, several more boards must be run through the system before the original board returns. According to my invention the board is immediately returned to the sawyer so that his highly skilled ability to analyze the defects in a given board and plan his cuts accordingly can proceed without interruption, thereby increasing the efficiency of the cutting operation.

Another disadvantage of the prior art devices is that they often do not return the board directly to the sawyer but instead return them along a path positioned several feet laterally of his normal working position. It will readily be appreciated that in working with large and heavy boards considerable time and effort will therefore be wasted in carrying each board to the saw from the position to which it is returned by the conveyor. According to my invention the cut board is run back across the saw table directly into the sawyer's hands.

A further disadvantage of most prior art devices is that they are not well adapted for handling relatively long boards. Thus, while many prior machines will handle boards of six to eight feet in length, boards over sixteen feet in length are processed in many woodworking plants. Most prior art devices are not practical for handling such long boards partially because of inherent operational limitations and also because of the vast amount of floor space which would be required by the apparatus. My invention, however, can handle boards of twenty feet or over as well as relatively short boards and yet requires a relatively small amount of floor space.

Certain prior devices require the use of of a splitter blade whose function is to enter the saw cut as the boards come out of the saw and thus to separate the two boards. Such devices are, however, often impractical and difficult to make work properly in practice. Because of internal stresses in the lumber, the saw cut sometimes pinches together so that the two boards are tight together as they come out of the saw. It also happens that the saw cut curves slightly toward one side or the other as the board goes through, because of these stresses. Under these conditions it may be seen that it is quite difficult to get reliable operation for every board with a system requiring a splitter blade. It is an advantage in my invention that no such splitting or dividing device is required for its successful operation.

With the above deficiencies of the prior art in mind it is thus one important object of this invention to provide an improved board handling apparatus adapted to return the board to the sawyer so that it may be rerun through a saw.

It is another object of this invention to provide an improved board handling apparatus having means for sorting and disposing of the scrap edgings or thin strips of rough edge or bark which are removed to smooth or straighten the board and also return the main board to the sawyer.

It is a further object of this invention to provide an improved board handling apparatus including selectively operable means for advancing the trim pieces as well as the main board to storage, when desired, or to any further operation as may be required in a woodworking plant.

It is still another object of this invention to provide an improved apparatus of the type described wherein the boards may be returned directly and rapidly to the sawyer as fast as he is able to receive them.

A further object of my invention is to provide an apparatus capable of handling any size of lumber normally ripped in conventional ripsaws, from very short to very long pieces, from thin boards up to the thickest which the ripsaw itself can accommodate, and from very narrow boards up to the widest boards commonly encountered in ripping practice, without the necessity that the sawyer change adjustments or settings when boards of such contrasting sizes are intermingled during the sawing operation.

It is a further object of this invention to provide a conveyor means in an apparatus of the type described having improved belt tensioning means and improved belt tracking characteristics.

It is a still further object of this invention to provide an improved board handling apparatus having an upper and lower conveyor means and including means for consistently and reliably determining the spacing and positioning of the conveyors in accordance with the dimensions of the board being handled.

It is yet another object of this invention to provide an improved board handling apparatus including an improved board sensing apparatus or switch means to control the operation of the several drive means of the apparatus.

It is still another object of this invention to provide an improved board handling apparatus adapted to return boards upon which work is being performed directly to the sawyer across the top of the saw table rather than to a station positioned laterally of the sawyer.

According to my invention the function of returning the board to the sawyer is accomplished in generally the same fashion as by a human helper. The apparatus receives the board as it travels out of the saw, stops its forward motion, moves the board laterally a sufficient distance to clear the saw blade and saw conveyor if any is used, then reverses the direction of travel of the board and conveys the board back toward the sawyer so that it travels back across the saw table and into the sawyer's hands.

Briefly stated, this invention includes a frame, a horizontally disposed conveyor means mounted on said frame, drive means operatively connected to said conveyor means and means for shifting said conveyors laterally with respect to the path of movement of material through said conveyor means. Specifically, according to a preferred form of the invention, the drive means normally runs in a first direction and is reversible responsive to movement of material therethrough. The conveyor means may, for example, comprise a pair of rollers but preferably comprises upper and lower spaced apart cooperating belt conveyors, and the spacing between the conveyors is preferably adjustable to receive boards of different thicknesses.

During operation, boards emerging from the outlet of the saw enter between the conveyors. In a preferred form of the invention, the conveyors grip the board firmly as the board continues to move therethrough. When the board has traveled completely out of the saw, the conveyor means is halted and shifted laterally carrying the boards with it. The conveyors are then driven in the reverse direction thereby returning the board to the saw table and back to the sawyer. When the end of board clears the conveyor as it returns to the saw table, the conveyors again shift laterally but in the opposite direction and again occupy their original or receiving position. The direction of rotational movement of the conveyors is then reversed. In a preferred form of the invention, the conveyors then move toward each other to establish a predetermined spacing therebetween to receive the next board or to again receive the uncut portion of the same board. These operations are all accomplished by the machine itself and do not require constant attention by the sawyer.

An additional function, that of disposing of the scrap edgings, is accomplished by adjusting the apparatus to allow these scraps to drop onto a truck or cart as they emerge from the saw. For this purpose the conveyor means is aligned with the saw in such a way that only the uncut portion of the board enters and is gripped by the conveyor means. In other words, one edge of the conveyor means is positioned in a plane passing through the saw blade whereby any material passing through the saw on the opposite side of this plane from the conveyor will not enter the conveying means of the board return mechanism but will instead drop down to a suitable receiving means.

A further advantage of my invention is its ability to handle boards of very short length. An upper conveyor means overhangs the ripsaw table and assumes the power feeding function at approximately the point where the feed chain of the ripsaw terminates its feeding action of the board. Thus even very short boards pass directly from control by the chain to control by the top belt. In returning such short boards, the fast acceleration of the belts obtainable with motive power devices such as suitable hydraulic motors gives the boards sufficient velocity to coast across the ripsaw table directly into the sawyer's hands.

Still another function carried out by my invention is that of optionally advancing the sawed pieces to storage or to the next operation rather than returning them to the sawyer. The latter operation will hereinafter be referred to simply as "feedout". This function may be accomplished in several different ways. According to a preferred means for accomplishing this end, a selectively operable switch or other suitable means is utilized to disable a return sensing mechanism so that the conveyor means will continue to run in a direction adapted to carry boards away from the saw and onto a suitable receiving means such as a cart, shop truck, rollers, conveyor or other appropriate auxiliary equipment required for subsequent operations. A final edging cut may be taken in conjunction with this feedout operation, the trim material dropping down to a receiving means as described.

I also provide means for returning both the trim as well as the original board to the sawyer if desired. This operation is performed by positioning the conveyor means so that it extends through the plane of the saw blade whereby material on both sides of the saw blade is gripped by the conveyor means. This function will be hereinafter referred to as a double-return operation and can be selectively operated by means of an electric switch or the like.

According to a further provision of my invention a receiving means such as a ramp or idle rollers is placed to receive the trimmed boards with the original board being returned automatically as described above. If desired, a small space can be provided between this ramp and the conveyor means so that scrap edgings and trim will be allowed to drop down and still be separated from the original board as described.

Under the various circumstances a given woodworking plant may use all of the above described operations at different times, depending upon operating requirements for disposing of the trim and boards or, if desired, these methods may be used in combination in the same sawing procedure, again depending upon the type of work being performed.

The invention will be best understood by reference to the following specification and to the accompanying drawings which disclose a preferred form of my invention wherein:

FIG. 3 is a side elevational view of the apparatus according to the present invention taken from the side opposite that shown in FIG. 2.

Figure 1:
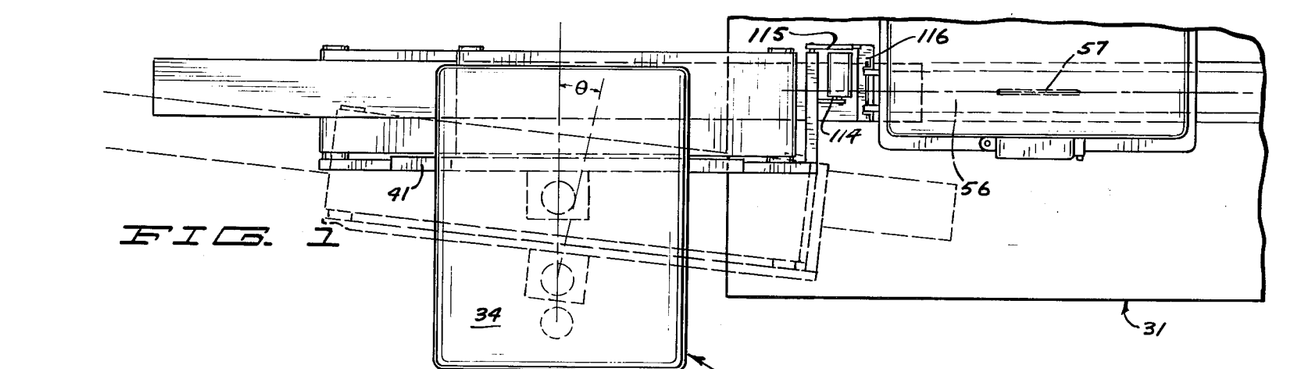
FIG. 1 is a plan view of a preferred form of the present invention illustrated in normal operating relationship with respect to a common straight-line ripsaw.
Figure 2:
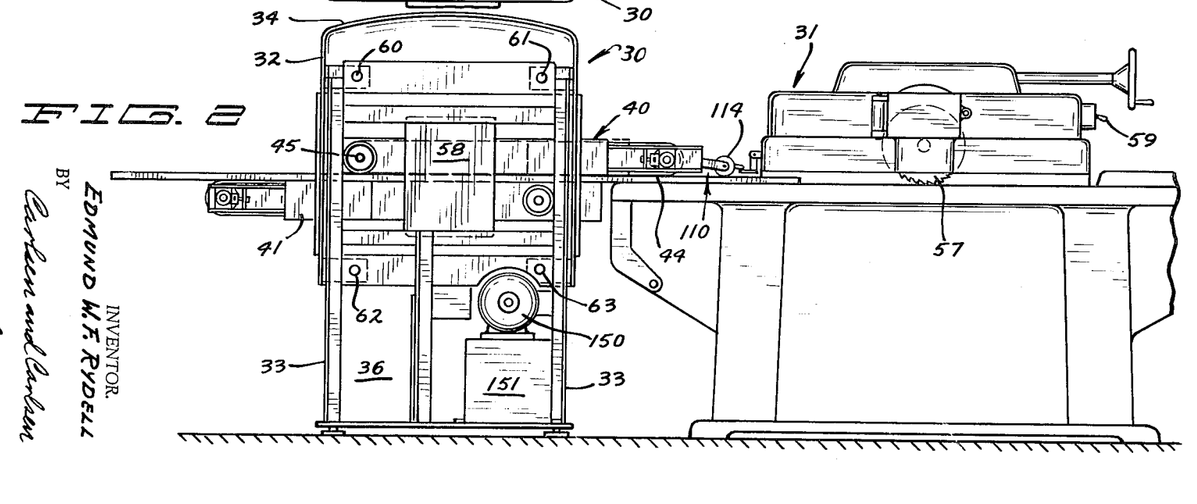
FIG. 2 is a side elevational view of the apparatus of FIG. 1, also showing the board handling apparatus in the normal operating relationship with a typical straight-line ripsaw.
Figure 4:
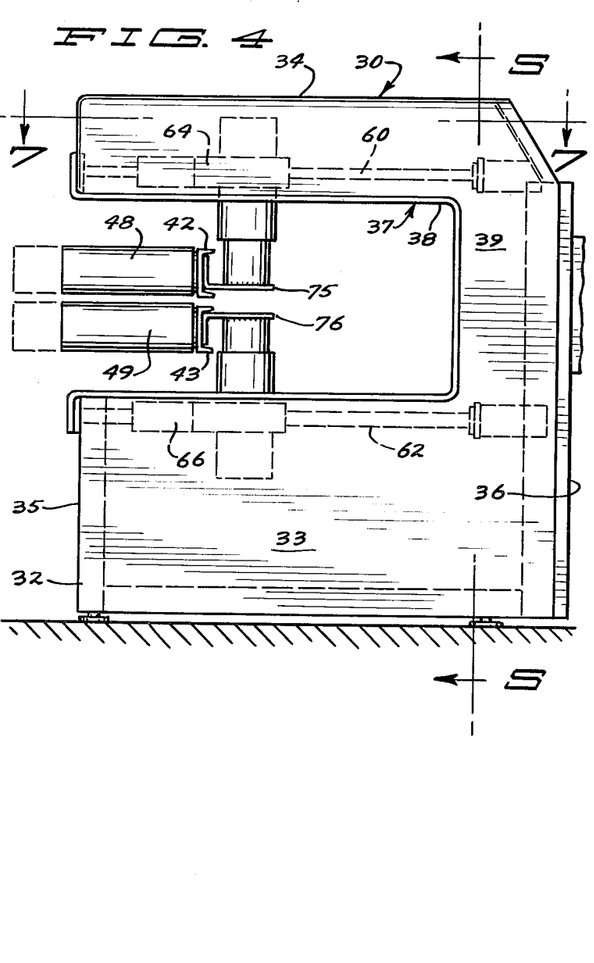
FIG. 4 is an end elevational view of the apparatus as viewed from the outlet side thereof.

Referring now to the drawings there is shown in FIGS. 1 and 2 a board handling apparatus 30 according to the present invention in position adjacent the outlet end of a conventional chain feed ripsaw 31. The apparatus 30 includes a heavy sheet metal supporting frame 32 in the general form of an inverted U when seen from the end as in FIG. 5 and including side walls 33 and a top wall 34. Connected between the side walls 33 is a front wall 35 (FIGS. 3 and 4) formed from a separate sheet of material and at the back of the apparatus a back wall 36. The side walls 33 of the frame 32 are provided with opposed horizontally disposed recesses 37, best seen in FIGS. 4 and 6, which extend from the front wall 35 a portion of the way to the rear wall 36 and it is in the opening formed by these recesses that the boards or other material being worked upon pass through the apparatus during operation as described more fully hereinbelow. As best seen in FIGS. 3 and 4 the edge of each recess 37 is lined with a strip of sheet material 38 which may be welded or otherwise rigidly attached to the frame.

In general, then, the recess 37 divides the frame into three portions including a base portion below the recesses 37, a central portion designated at 39 extending upwardly from the base to the rear of the recesses and a laterally extending top portion supported by the upright portion 39. Extending downwardly from the upper portion is an upper conveyor assembly, designated generally at 40 (FIG. 2), and extending upwardly from the base is a cooperating lower conveyor assembly 41. These conveyor assemblies include rotatable conveyor elements mounted for rotation about horizontal axes disposed generally perpendicular to the path of movement of material through the apparatus. The conveyor assemblies 40 and 41 can be moved closer to each other or farther apart as conditions require, they are also pivotal about a vertical axis and both are laterally shiftable as a unit along an axis parallel the axes of rotation of the conveyor elements, all as described more fully hereinbelow. The upper conveyor 40 is preferably offset toward the inlet of the apparatus 30 with respect to the lower conveyor 41 as shown in the drawings (FIGS. 2 and 3) and thus will engage a board before it leaves the saw table.

The upper conveyor assembly includes a horizontally disposed conveyor frame member or channel 42 (FIGS. 4 and 6) and the lower conveyor member 41 includes a similar frame member or channel 43. Rotatably mounted at opposite ends of the upper frame member 42 are a a pair of spaced apart rotatable conveyor elements or pulleys 44 and 45 (FIG. 3). These pulleys are rotatable on parallel axes positioned perpendicular to a line extending between the apparatus of this invention and the primary tool 31. Mounted in a similar manner on lower conveyor frame member 43 are a pair of spaced apart rotatable conveyor elements or pulleys 46 and 47, these pulleys being mounted parallel to the pulleys 44 and 45. Entrained over the upper pulleys 44 and 45 is an upper conveyor belt 48 and entrained over the lower pulleys 46 and 47 is a lower conveyor belt 49. The details of the mounting and construction of the pulleys will be more fully described hereinbelow.

The centers of top and bottom belts 48 and 49 slide upon and are supported by braced upper and lower slide plates 50 and 51 respectively secured to the belt channels 42 and 43 respectively, as shown in FIGS. 3, 6, 9, and 11.

As best seen in FIGS. 9–12 the lower conveyor 41 is powered by a drive means such as a reversible hydraulic drive motor 52 secured rigidly to channel 43 and including a motor shaft 53 connected to the pulley 46. The upper conveyor 40 is powered by a similar drive means such as reversible hydraulic drive motor 54 which is rigidly secured to the channel 42 and includes a motor shaft 55 connected to pulley 45.

The pulleys and belts 48 and 49 for most purposes extend laterally on either side of the plane passing through the saw blade of ripsaw 31, hereinafter referred to as the saw line and designated at 56 as shown in FIG. 1, so that material on both sides of the saw blade 57 will enter between the belts and be returned to the sawyer as hereinafter explained. The dotted lines of FIG. 1 indicate the position of the conveyor assemblies and belts after they are shifted laterally along an axis extending perpendicular to the saw line 56 and also pivoted through an angle θ about a vertical axis. If the trim is not to be returned the pulleys and belts are positioned entirely to one side of the saw line 56.

Referring now particularly to FIG. 2 there is shown an electric control box 58 which includes the usual transformers, relays, switches and other known electrical control apparatus described in detail hereinbelow. Wired to the control box 58 by conductors (not shown) is a remote control panel 59 which is preferably located as shown on the ripsaw in front of the operator's position, so that the operator can conveniently control the starting, stopping, feedout, double-return as well as the speed of the return functions. The control box 58 is supplied with current from a power supply by suitable conductors (not shown).

As best seen in FIGS. 2 and 4 there are provided four spaced apart parallel slide rods, designated at 60, 61, 62 and 63. As can be seen in FIG. 4 the slide rods 60, 61, 62 and 63 extend perpendicular to the saw line 56 and parallel with the upper and lower edges of the recess 37. Two of the rods are secured at each end of the frame 32 at the upper portion of the apparatus above the recess 37 and two of the rods are secured at each end to the frame in the base portion of the machine below the recess 37.

Figure 8:
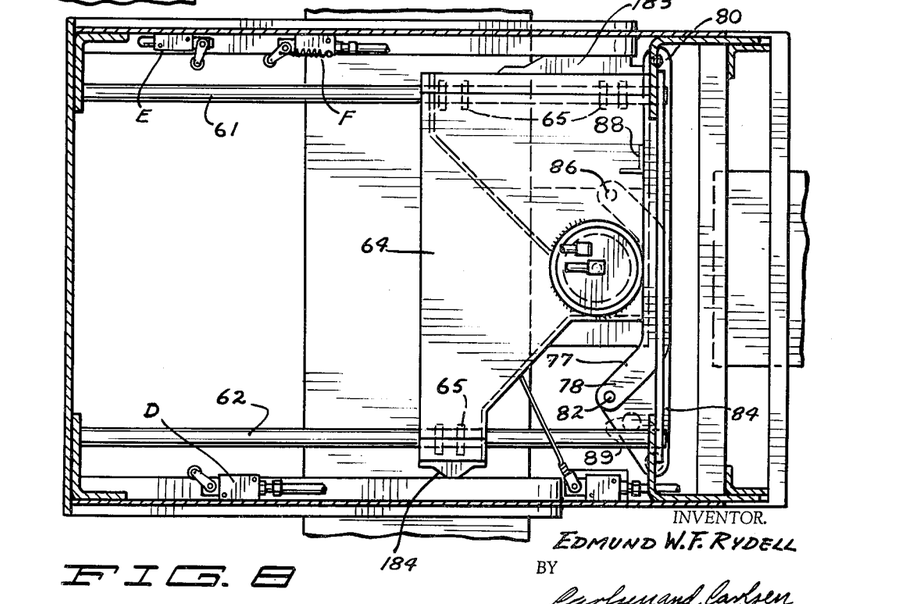
FIG. 8 is a view similar to FIG. 7 but showing the carriage in a different position.

Slidably mounted on the upper two rods 60 and 61 as shown in FIG. 8 is an upper carriage 64 having secured thereto low friction bushings 65, the bushings being slidably mounted on each of the upper rods 60 and 61. According to a preferred form of the invention these bushings comprise ball bushings of known construction. Slidably mounted on the lower pair of rods 62 and 63 is a similar carriage 66. Carriage 66 is also provided with bushings similar to those used in the upper carriage. These bushings are slidably mounted on the lower rods 62 and 63.

The conveyor assemblies 40 and 41 are supported from the carriage 64 and 66 by means of telescoping clamp assemblies, designated at 67 and 68 respectively (FIGS. 5 and 6) which serve to separate the conveyor assemblies or move them together as required by the particular operating circumstances. The upper and lower telescoping clamp assemblies are similar in construction excepting that the lower clamp assembly 68 is, of course, extensive upwardly rather than downwardly.

Figure 6:
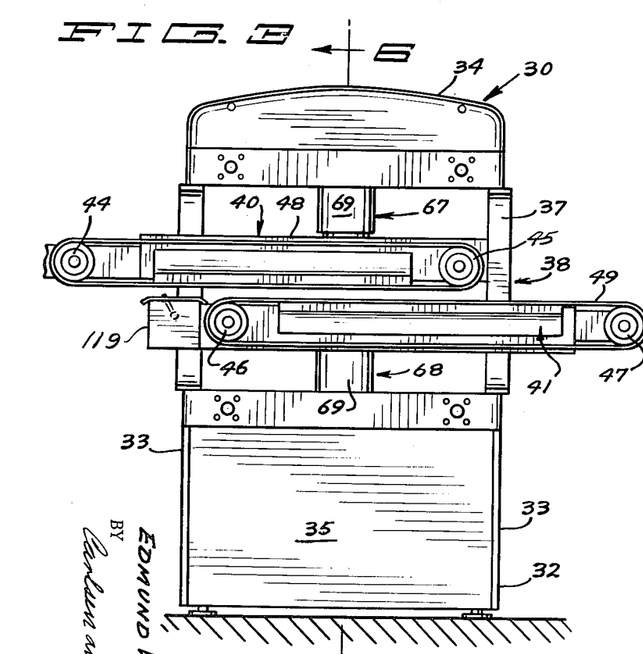
FIG. 6 is an enlarged fragmentary vertical sectional view along line 6—6 of FIGS. 3 and 5.

As best seen in FIG. 6, each of the clamp systems 67 and 68 comprises an outer vertically disposed tubular member 69 fixed within an opening in one of the carriages. A pair of bushings 70 and 72 are mounted concentrically within each of tubes 69. Bushing 70 is rigidly secured to tube 69 and a vertically disposed telescoping tubular member 71 is rigidly secured to the bushing 70 such that tube 71 will be able to slide easily within tube 69.

Actuator means such as hydraulic cylinders 73 including the usual piston and rods are operatively connected between each of the telescoping members 71 and the members 69 within which member 71 is mounted. The cylinders 73 are secured to a plate 74 affixed to the upper and lower ends respectively of the upper and lower tubes 69. The actuator rod of each cylinder is secured to one of bracket members 75 and 76 which are each secured to one of the telescoping tubes 71 and form the end wall thereof. These hydraulic cylinders 73 when operated cause the members 71 to slide upwardly or downwardly alonge a vertical axis with respect to the members 69 and also with respect to the carriage upon which each of members 69 is mounted.

Rigidly connected to the upper bracket member 75 is the conveyor frame member 42 of the upper conveyor assembly. Connected to the lower bracket 76 is the lower conveyor frame member 43. As will be understood, lateral stresses upon the conveyor assemblies caused by boards being passed through the apparatus will be borne by the bearings 70 and 72 instead of cylinders 73, thereby preventing damage to the hydraulic cylinders 73.

The clamping assembly construction described above is a unique and simple solution to the problem of providing the required vertical movement of the conveyors while also allowing pivotal movement of the conveyors about a vertical axis. This pivotal movement of the conveyors, while it is not essential in all operations, is required in connection with handling relatively long boards.

When relatively long boards are being handled, a support device of any suitable type, such as a support table (not shown), is positioned on the opposite side of the board handling apparatus 30 from the ripsaw 31 for the purpose of supporting the free end of boards extending beyond the conveyors. If such support means were not provided the excessive leverage of relatively long boards hanging out of the machine could force the conveyors apart.

The pivotal action of the conveyor assemblies about a vertical axis occurs as the result of the use of a support table as described above since when the lateral shifting of the conveyors takes place, the end of the boards supported on the table will not shift due to the frictional engagement between the boards and the table. Thus, as can be seen, lateral movement of the conveyors also results in pivotal movement of the conveyors through an angle designated $\theta$ in FIG. 1.

Figure 5:
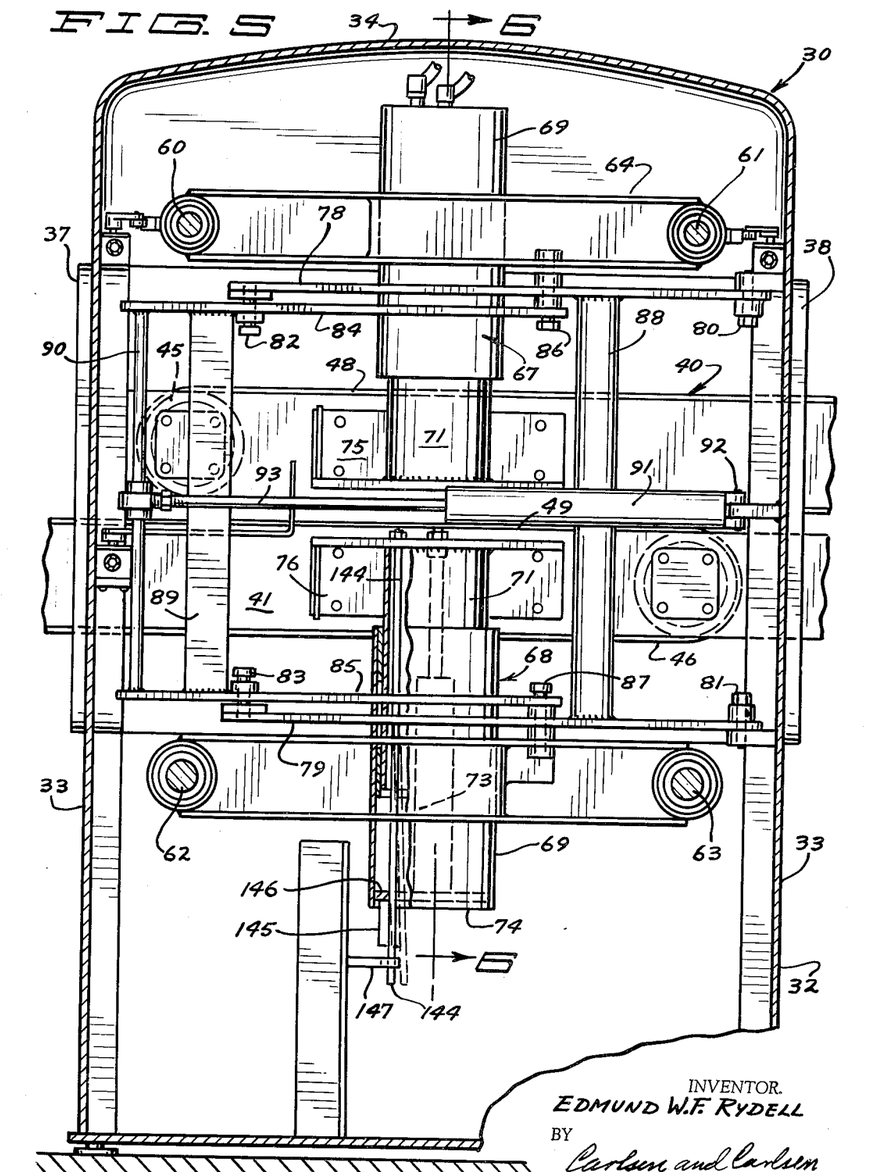
FIG. 5 is a vertical sectional view taken along line 5—5 of FIG. 4.
Figure 7:
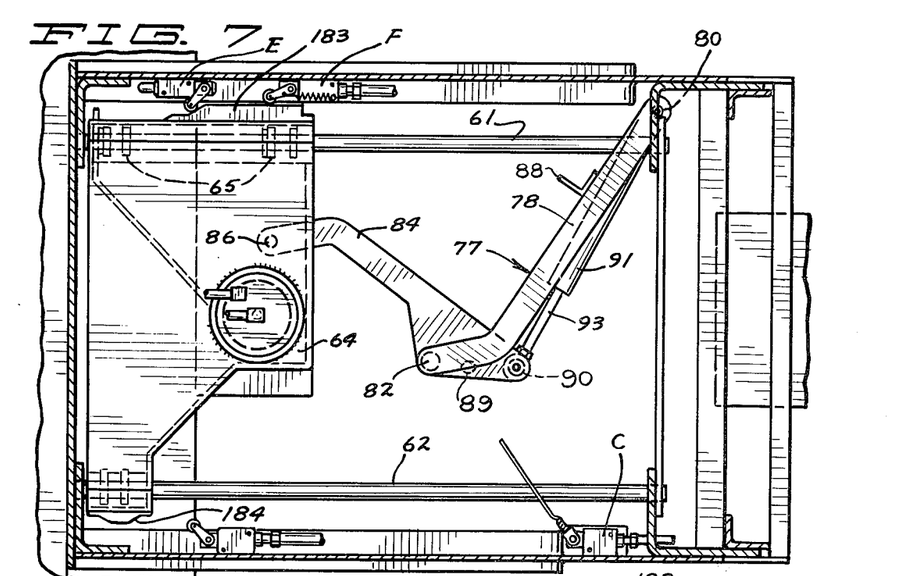
FIG. 7 is a horizontal sectional view taken along line 7—7 of FIG. 4.

The carriages 64 and 66 can be seen in two extreme positions of movement on the slide rods in FIGS. 7 and 8. As mentioned hereinbefore the carriages serve as a mount for the clamp assembly 67 and 68 which in turn supports the upper and lower conveyor assemblies respectively. The carriages 64 and 66 are moved laterally upon the rods 60, 61, 62 and 63 by means of a shifting means, designated generally at 77. The shifting means 77 consists of two vertically spaced apart horizontally disposed frame arms 78 and 79, FIG. 5, which are both pivotally connected at one end of the frame by means of coaxial pins 80 and 81 best seen in FIG. 5. Pivotally connected to the free ends of the frame arms 78 and 79 by means of coaxial pivot pins 82 and 83 are a pair of vertically spaced apart horizontally disposed arms 84 and 85. The other ends of arms 84 and 85 are pivotally connected to the carriages 64 and 66 by pins 86 and 87 respectively. Connected between the arms 78 and 79 is a brace member 88 and connected between the arm members 84 and 85 is a brace member 89. Also connected between the arm members 84 and 85 is a second vertically disposed brace member 90. Pivotally connected between the frame 32 and brace member 90 is an actuator means such as cylinder 91. The cylinder 91 is pivotally connected to the frame 32 by pin 92. The actuator rod 93 of the actuator is pivotally connected to the brace 90. Thus, as can be seen in FIGS. 5, 7 and 8, when the actuator rod 93 is retracted into cylinder 91, the frame arms or links 78, 79, 84 and 85 are moved to the extended position, or to the left in FIGS. 7 and 8, thereby sliding the carriages 64 and 66 laterally to the left in the drawings on the slide bars 60, 61, 62 and 63. When the actuator rod 93 is moved to the extended position, the frame arms are retracted to the right in FIGS. 7 and 8 and thereby shift the carriages 64 and 66 to the right in the drawings. As the carriages slide laterally on the slide bars 60, 61, 62 and 63, the conveyor means 40 and 41, of course, also move laterally. It is thus apparent that the clamping and conveyor assemblies move laterally as a unit within the recess 37.

The upper and lower conveyor means 40 and 41 respectively constitute what I believe to be a unique development in the powered belt field in that the pulleys for each belt are supported from one side only, since as can be seen the entire framework used for supporting the pulleys of each conveyor is mounted on the right side thereof in FIG. 6. This provision is desirable because of the requirement that the conveyors be supported by movable clamping means rather than from legs or brackets on each side of the belt as is utilized in a conventional conveyor construction.

According to the present invention the pulleys 46, 47, 44 and 45 are hollow, as best seen in FIGS. 9, 11, 13 and 14, and each pair is supported by a cantilevered bearing housing 94 and 95 (best seen in FIGS. 13 and 14) which extend the location of a driven pulley bearing 96 and an idler pulley main bearing 97 to a point somewhat beyond the center line 98 of each belt. As a result, the entire load of the belt can be borne at the center of each pulley. A further consideration which makes this unilateral support system desirable is that by so constructing the apparatus no part thereof projects beyond the outside edges of the belts. If this were not done, edgings or trim might become entangled in projecting bearings or framework and fail to drop as required. A still further advantage of the unilateral support system is that it makes possible independent belt tightening and belt tracking means as disclosed hereinbelow.

Figure 9:
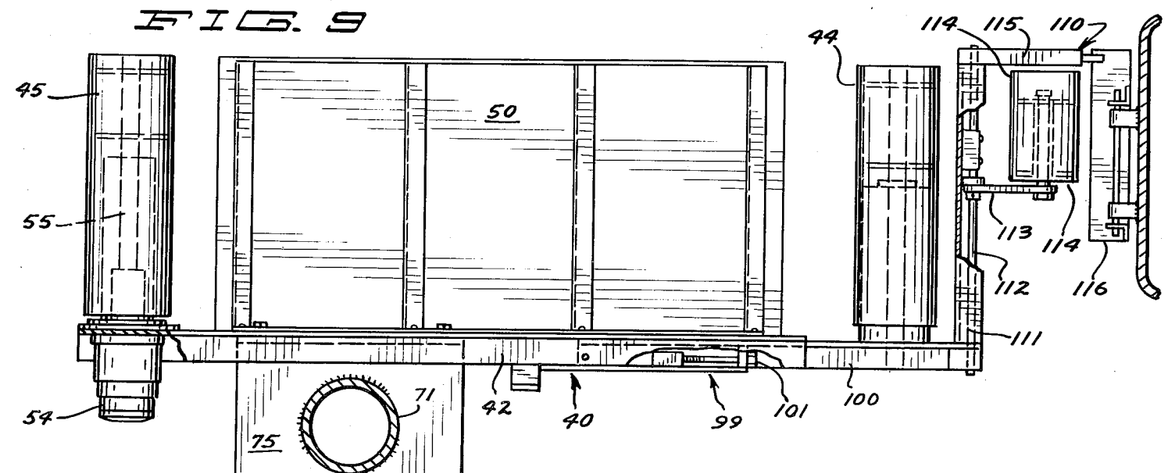
FIG. 9 is a plan view of the upper conveyor means with the belt omitted for clarity.
Figure 10:
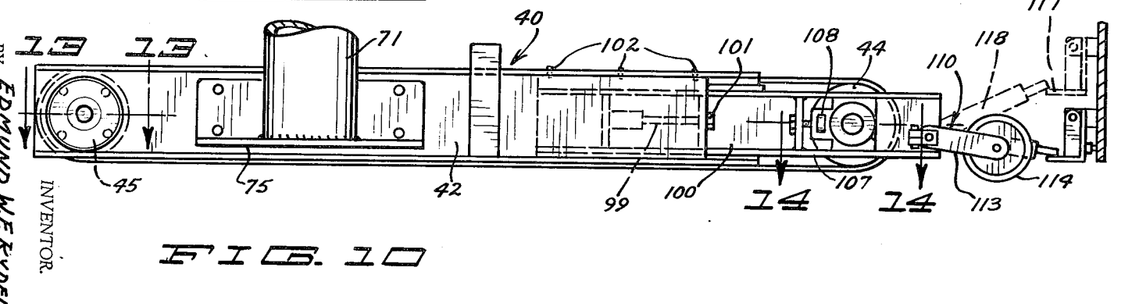
FIG. 10 is a side elevational view of the upper conveyor means.
Figure 11:
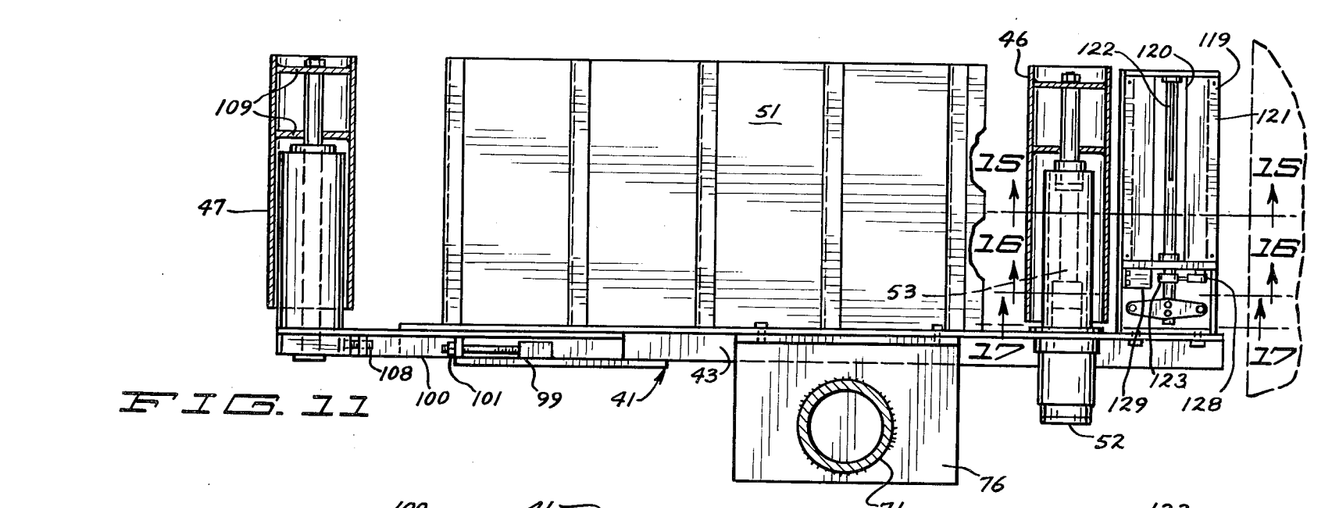
FIG. 11 is a plan view of the lower conveyor means with the belt omitted for clarity.
Figure 12:
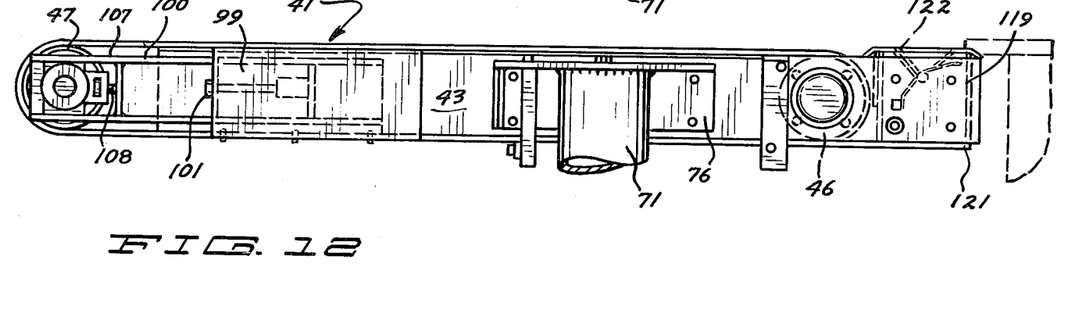
FIG. 12 is a side elevational view of the lower conveyor means.
Figure 13:
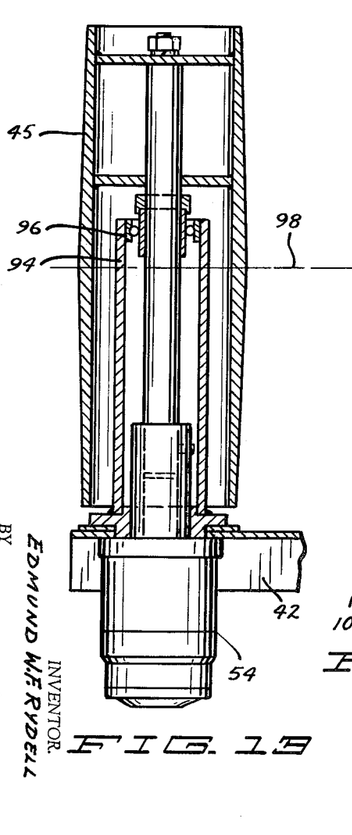
FIG. 13 is a fragmentary enlarged horizontal sectional view taken along line 13—13 of FIG. 10.

Belt tightening is accomplished by means of a dovetail slide, designated at 99 and best seen in connection with the upper conveyor assembly in FIGS. 9 and 10 and in connection with the lower conveyor assembly in FIGS. 11 and 12. These dovetail slides 99 are located between an idler pulley assembly 100 and each of the main frame members 43 and 42. Thus, as can be seen, sliding engagement between each of the idler pulley assemblies 100 and the main frame member allows the pulleys 44 and 45 as well as pulleys 46 and 47 to be moved apart or together, as required. The adjustment of the distance between pulleys 46 and 47 as well as pulleys 44 and 45 can be readily changed solely by the adjustment of a single screw 101 connected between the end of frame members 43 and 42 and a portion of each idler pulley assembly 100 and it is therefore impossible to disturb belt tracking by making this adjustment. To securely lock each idler pulley assembly 100 in a selected position with respect to the main conveyor assembly frame members 42 and 43 a plurality of gib screws 102 are screw-threaded into the upper portion of frame members 42 and 43 and extend downwardly therethrough to engage the upper surface of each of the idler pulley assemblies 100. The tight fit made possible by the use of gib screws 102 will thus keep the pulleys parallel to assure consistent belt tracking.

Figures 14, 15, 16, 17:
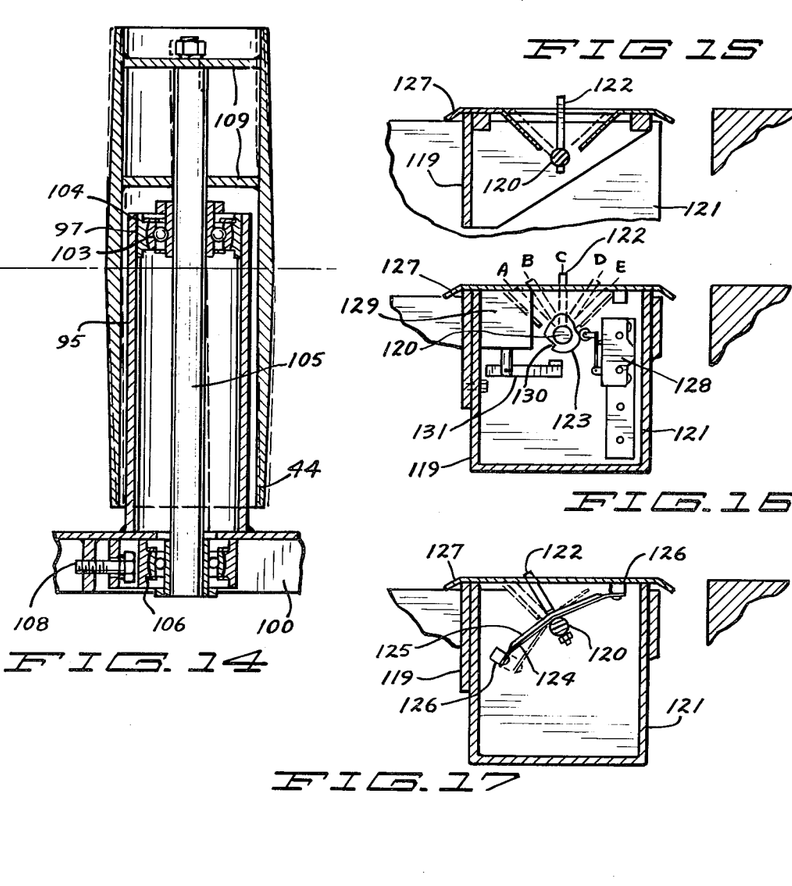
FIG. 14 is a fragmentary enlarged horizontal sectional view taken along line 14—14 of FIG. 10.
FIG. 15 is a fragmentary enlarged vertical sectional view on line 15—15 of FIG. 11.
FIG. 16 is a fragmentary vertical sectional view on line 16—16 of FIG. 11.
FIG. 17 is a fragmentary enlarged vertical sectional view on line 17—17 of FIG. 11.

An independent belt tracking adjustment is provided to prevent lateral movement of the belts on the pulleys from affecting belt tension as shown in FIG. 14. Independent belt tracking is accomplished by the use of a so-called self-aligned ball bearing of known construction to form the main bearing 97 of each of idler pulleys 44 and 47. Each of bearings 97 is provided with a spherical outer ring 103 supported in a mating spherical seat 104 attached rigidly to one of housings 95, thereby enabling the bearing 97 to pivot with respect to the housing. Rotatably mounted within each of bearings 97 is a shaft 105 and it is on these shafts that the idler pulleys 44 and 47 are secured.

A similar self-centering bearing is used to form a tracking adjustment bearing 106 connected between the end of each of shafts 105 and the pulley assemblies 100. Each track adjustment bearing 106 slides in horizontally disposed guides 107 (FIGS. 10 and 12) provided in each of the idler pulley assemblies 100 and each of the bearings 106 is fitted with an adjusting screw 108 threaded into a web of the idler pulley assemblies 100. Ajustment of the screw 108 causes each of the tracking adjustment bearings 106 to move longitudinally of the conveyor assembly in its slide 107. The sliding movement pivots the shaft 105 about the main bearing 97 in a horizontal plane, as shown by the dotted lines of FIG. 14. The pulleys 44 and 47, being rigidly secured to these shafts by internal webs 109, thus pivot with the shafts to accomplish proper belt tracking in both the upper and lower conveyor assemblies.

In each cycle of operation, the upper belt, after returning the board, is elevated to its uppermost position and is also shifted laterally outward to the normal receiving position of FIG. 7. Upon returning to the receiving position the upper conveyor 40 drops to the correct height for the lumber being ripped. The correct height is ascertained by a height adjustment means 110, as best seen in FIGS. 9 and 10. The height adjustment means 110 is pivotally connected to the upper pulley assembly 100 for movement with respect thereto about a horizontal axis and is disposed on the inlet side of the apparatus from pulley 44. The height adjustment means 110 is mounted upon a mounting bracket 111 secured rigidly to the upper pulley assembly 100 and extends parallel to the axis of pulley 44. The bracket 111 has secured rigidly to the end thereof attached to the pulley assembly 100 a resilient member such as a torsion bar 112. At the center of torsion bar 112 is rigidly secured one end of a link 113. Upon the other end of link 113 a rotatable roller 114 is mounted. The roller 114 is thus normally biased downwardly by the torsion bar 112. Extending horizontally and secured rigidly to the free end of torsion bar 112 is a height adjustment bar 115 which is adapted to contact the upper surface of a height gauge 116 affixed to the outlet end of the ripsaw 31. Upon contacting the height gauge 116, the height bar 115 prevents any further descent, being tensioned by the torsion bar 112 under torsional strain. Resilient mounting of bar 115 reduces the shock to the top belt in suddenly stopping. The hood of the ripsaw serves as a good index for height setting, as in the vast majority of saws in use, this hood moves with the pressure rollers which it houses and must be set to the correct height for ripping by the sawyer. Thus the proper height setting for the top belt is achieved automatically from the regular setting of the ripsaw.

The roller 114 of FIGS. 9 and 10 further serves to ensure the correct height setting of the top belt. It is sprung downward by the torsion bar 112, and if raised by an approaching board transmits a force tending to raise the whole top belt prior to the belt being contacted by the board. The roller in effect serves as a buffer for the top belt to protect it from sudden contact with warped or oversize boards. The small mass of the roller may be much more easily bumped upward than the large mass of the top belt assembly. The top belt assembly is hydraulically balanced by the upper cylinder 73 so that only a small portion of the full weight of the top belt assembly acts on the boards. If in standing idle for a long period the oil in this cylinder should gradually leak past the seals, the top belt would gradually tend to settle to its lowest position. It the height bar were perfectly rigid, the full weight of the top belt assembly would be transmitted to the ripsaw hood as shown in FIG. 2, with possible strain or damage. The resilient torsion bar 112, however, allows the height bar 115 to pivot upward under this full weight, so that if the ripsaw had been set at its largest opening shown by dotted lines 117 in FIG. 10, the height bar would pivot upwardly to the dotted line position 118 of FIG. 10, thereby transmitting only a small portion of the full weight of the top belt to the ripsaw hood.

The various motions of the machine, with the exception of cerain resiliently mounted elements described above, are powered by hydraulic means—hydraulic cylinders for the shift and belt clamp functions, and hydraulic motors for the belt power. These hydraulic elements are actuated by solenoid controlled hydraulic valves, and the latter are directly controlled by limit switches C, D, E and F shown in FIGS. 7, 8 and 21 and the board sensing switch B of FIGS. 11, 12, 15, 16 and 17.

The board sensing switch B is secured rigidly to channel member 43 just ahead of the bottom belt as shown in FIGS. 11 and 12, 15, 16 and 17. As shown in FIG. 11, the switch B includes a horizontally disposed rotatable shaft 120 journaled in switch box 121, a paddle 122 secured thereto and extending radially therefrom, a cam 123 also secured to shaft 120, and a single-leaf spring 124 and spring retainer 125 to secure the spring 124 to the shaft 120. A spring shoe 126 is secured to each end of the spring 124 for purposes explained hereinbelow. The paddle 122 protrudes through a slide plate 127 affixed to the top of switch box 121, over which the lumber slides.

In operation, the paddle has five pertinent positions designated a, b, c, d and e as shown in FIG. 16. The cam 123 is located on the shaft such that the lobe thereon actuates a current making and breaking means such as microswitch 128 when the paddle 122 passes through position c. As a board approaches from the ripsaw at the right, the paddle is at rest in position b, its weight being supported by the spring shoe 126 at the right in the drawings which is in contact with the underside of the slide plate 127. As the approaching board passes over, it depresses the paddle to position a against the spring force developed as the spring is forced away from the retainer 125 to the position shown in FIG. 17 by the dotted lines. When the board passes off the mechanism, the paddle is thrown by the spring through position c, actuating the microswitch 128 to its other pole, and comes to rest at position d, supported by the spring shoe 126 at the left in the drawings. The actuation of the microswitch 128 causes the various machine functions to occur as previously described including reversing of the conveyor drive means and lateral shifting of the conveyors, the board returns from the left in the drawings, its approaching end depresses and spring-loads the paddle this time to position e. When the board passes off the mechanism, the spring 124 throws the paddle through position c reversing the microswitch 128 to its original pole and the paddle again comes to rest at position b. With the microswitch 128 returned to its original pole or position, the apparatus is again ready to receive the next board, and a cycle of operation has been completed. The function of switch B is (a) to stop the belts and cause the side shift motion when the board is completely out of the ripsaw, and (b) to stop the belts and shift back again when the board has been returned and is completely out of the apparatus. Since this mechanism must register the passage of the back end of the board rather than the front end, ordinary limit switches would not serve except in complex circuits involving relays. The switch mechanism B is a simple solution to the problem, and gives a continuous current through the single pole, double throw switch 128 of FIG. 16, so that its two positions directly control the solenoid-operated hydraulic valves which furnish the two reactions required in (a) and (b) above, without the need for relays.

The switch B is simple in design, cannot get out of step with the boards, cannot operate backwards (or trigger the wrong functions), requires only one circuit making and breaking means and no relays.

The feedout option mechanism used to interrupt the return or reverse conveyor drive so that the boards continue to move out of the apparatus away from the saw 31 as discussed hereinabove comprises a solenoid 129 mounted within the switch box 121 and operated by a manual switch 59. The cam 123 is provided with a notch 130 such that a bar 131 fastened to the armature of the solenoid 129 engages the notch 130 when the solenoid 129 is energized by closing switch 59 thereby locking the paddle so that only the range of motion of the paddle of a to b is allowed. The cam cannot therefore pass position c, the microswitch 128 cannot be actuated, and belts will continue to run in the feed direction to the left in the drawings regardless of the passage of boards until the solenoid 129 is de-energized by opening switch 9.

In the handling of long boards, the conveyors are required to pivot through a small angle θ, as shown in FIG. 1 and as previously explained. Means must be provided for returning the conveyors to their normal or perpendicular condition parallel the saw line 56. This is accomplished by resilient means such as a vertically disposed leaf spring 132 of triangular shape for each conveyor as shown in enlarged detail in FIGS. 18 and 19, and ins section in FIG. 20. The springs 132 are both fastened at their midpoints by fasteners such as screws 133 to the outer clamp tubes 69 which are stationary on the carriage. Each of the springs 132 carries at its outer end a slide block 134, which slides on a slide face 135 secured rigidly to each of belt channels 42 and 43. Thus the springs 132 exert a continuous restoring force on each of conveyor channels 42 and 43, one of which is shown in the pivoted position by the dotted lines designated 136 in FIG. 20. Regardless of the extension or contraction of the telescoping tubes 69 and 71, each of slide blocks 134 always exerts force on the associated slide face 135, as illustrated by the two extremes shown in FIGS. 18 and 19.

Figure 18:
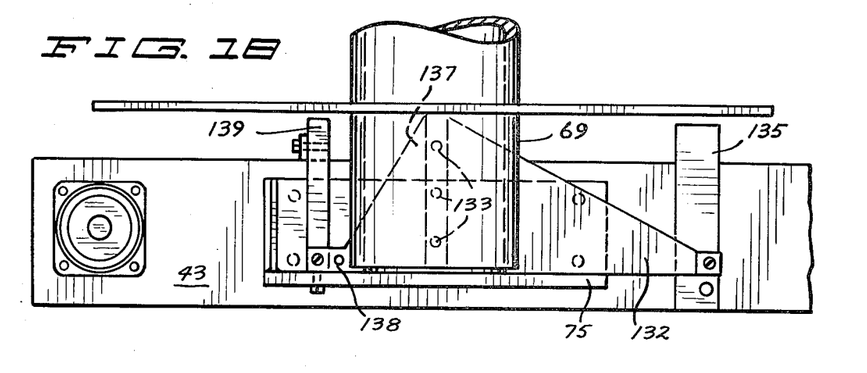
FIG. 18 is a fragmentary front elevational view illustrating the conveyor paralleling spring system as applied to the upper conveying means.
Figure 19:
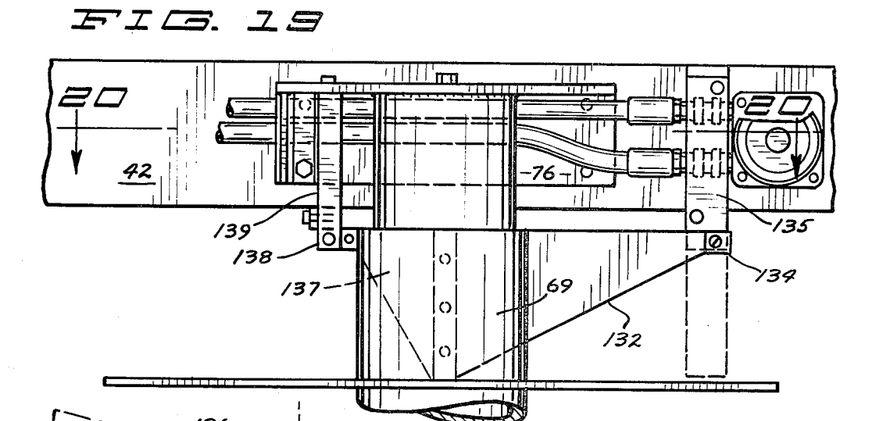
FIG. 19 is a fragmentary front elevational view illustrating the conveyor paralleling spring system as applied to the lower conveying means.
Figure 20:
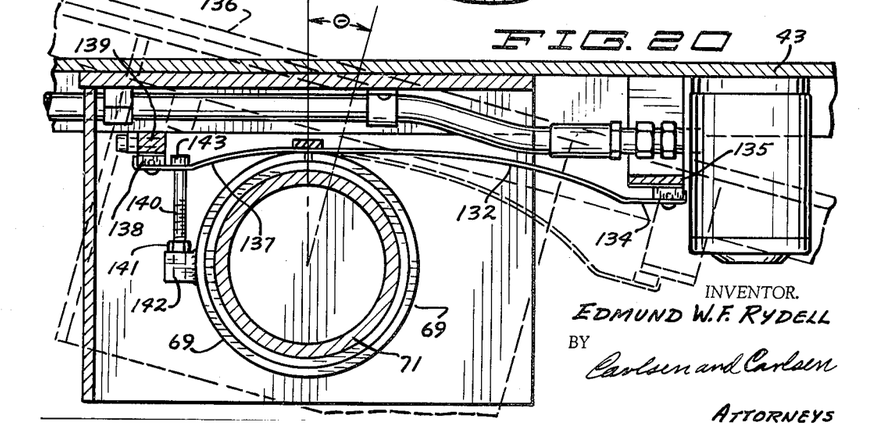
FIG. 20 is a fragmentary horizontal sectional view on line 20—20 of FIG. 19.

The left extension of each of leaf springs 132 forms a short, stiff spring 137 also fitted at the free end thereof with a similar slide block 138. A second slide plate 139 is secured rigidly to each of channels 42 and 43. The function of spring 137 is to serve as a bumper for each conveyor channel as it returns to the position parallel the saw line 56. A paralleling screw 140 and lock nut 141 is provided on a threaded extension 142 on each of the outer clamp tubes 69. The screw 140 projects through an opening in the spring 137 and is provided with a head 143 positioned between the spring 137 and the conveyor frame. By means of the screws 140 the conveyors can be adjusted for parallelism with each other and with the saw line 56 of the ripsaw. This spring 137 presents a stiff but yielding force to the return of the conveyor to minimize the shock of suddenly stopping.

Since slide blocks 138 of each of springs 137 tend to hold the conveyors in the normal position, the conveyors will, of course, swing back to the normal position as they are returning the board to the sawyer, as soon as contact with the outboard support table (not shown) has ceased. Thus the board is delivered to the sawyer along a line parallel to the saw line 56 rather than at an angle.

A further provision incorporated in the conveyor system and more particularly the lower conveyor 41, as best shown in FIG. 5, causes the conveyor belts to elevate the board a small amount above the ripsaw table as the conveyors shift to the return position. The purpose of this provision is to ensure that the front end of the board does not drag on the ripsaw table and as a result prevent the pivoted belts from returning to the normal position parallel the saw line 56 as the board is returned. A further advantage of elevating the boards a small amount is that the friction between the boards and the saw table is reduced, so that boards slide more easily back to the sawyer.

This board elevation is accomplished by a vertically disposed tension rod 144 as shown in FIG. 5. The rod 144 has a hook 145 fastened thereto near its bottom end, and the rod 144 is adjustably threaded onto the top plate 76 of the inner telescoping tube 71 and extends downwardly through the lower tube 69. The hook catches over the edge of a hole 146 in the lower end plate 74 of the outer tube 69 in such a manner as to prevent the lower hydraulic cylinder 73 from fully extending the inner telescoping tube 71 and lower conveyor 41. In this hooked condition shown by solid lines in FIG. 5, the upper surface of the bottom conveyor belt 49 is perfectly aligned with the height of the ripsaw table, and is always positioned thus when receiving boards from the ripsaw. As the belts shift to the return position (toward the viewer in FIG. 5) the lower end of rod 144 contacts the cam surface of a horizontally disposed cam 147 secured rigidly to a portion of the frame. The cam surface of cam 147 is inclined with respect to the path of movement of the carriages on the slide rods, the end thereof nearest the viewer being located farther to the right in FIG. 5 than the other end thereof. Engagement between the rod 144 and the cam 147 causes the rod to be flexed sideways or to the right in FIG. 5, as shown by the dotted lines, so that the hook 145 comes off the edge of the hole 146. This removes the restraining force of the rod 144 so that the lower hydraulic cylinder 73 is allowed to complete its stroke, elevating both conveyors and the gripped board by a small amount as determined by the limits of movement of the actuator rod of the lower actuator 73.

After the board has been delivered back to the sawyer, both conveyors separate by the full amount and remain so until shifted to the receiving position, whereupon the bottom conveyor is raised to the receiving height through the action of lower actuator 73 but as limited by the tension rod 144. The top conveyor drops to the proper height determined by the height bar, as described hereinabove.

A further purpose in having the bottom conveyor drop and then rise to the receiving position on each cycle comes about because of certain ripping practices. On some classes of work it is possible to feed in a second board while the first board is being received and returned by the helper. Then the first board is fed through again, and so on, so that there are always two boards being handled and sawed. In this type of service, the second board may already be coming out of the ripsaw before the apparatus has completed return of the first board. Thin, flexible boards may hang down somewhat below the saw table height, thus making it desirable that the bottom conveyor be dropped so that in shifting back it will be under such boards before rising to the proper receiving height. Because of its fast rate of return, the apparatus can keep pace with boards fed through the ripsaw in quite rapid succession.

Figures 21, 22:
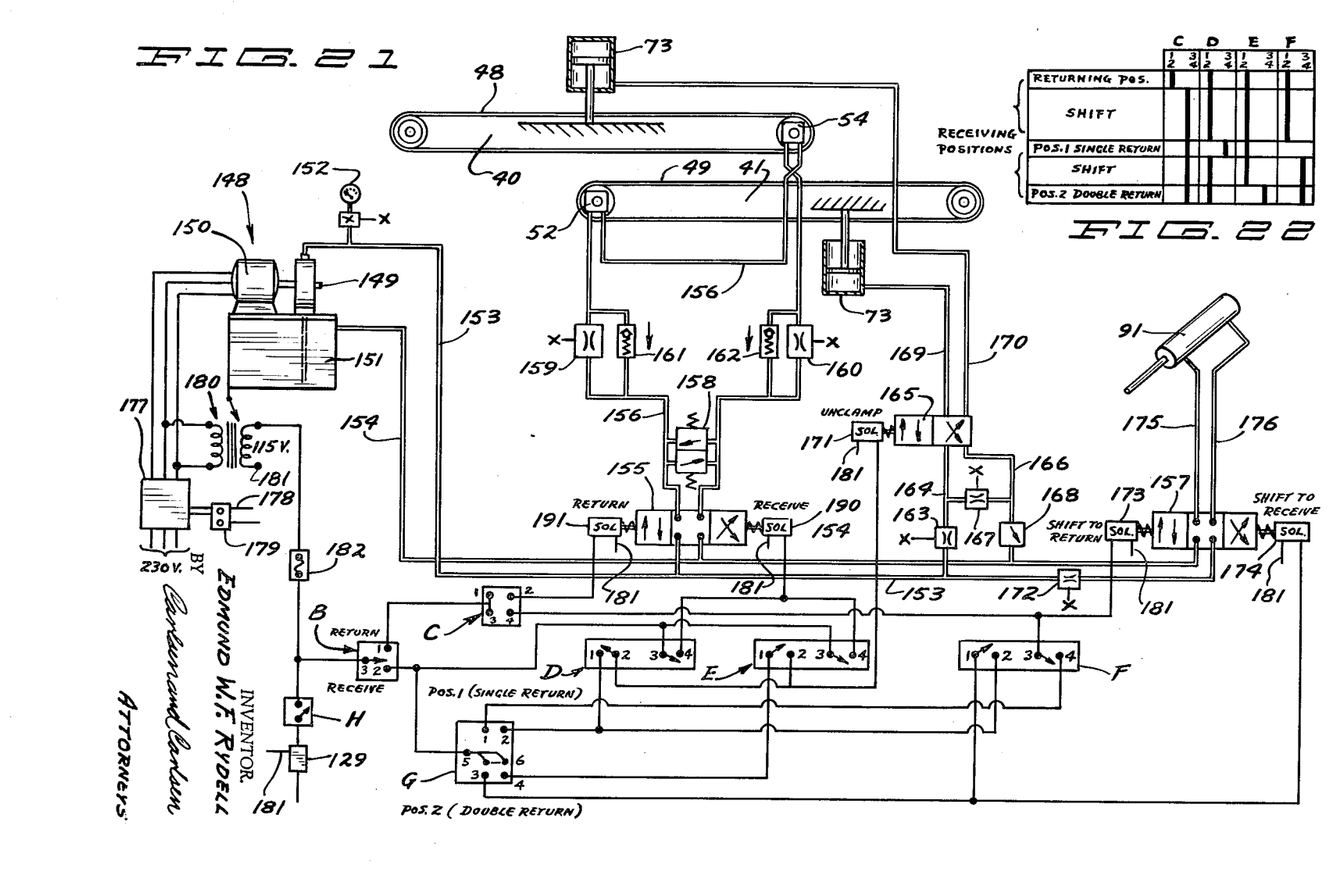
FIG. 21 is a combined hydraulic and electrical schematic diagram showing the control and power elements of the apparatus.
FIG. 22 is a table illustrating the condition of the various switches of the apparatus during different stages of operation.

Referring now to FIG. 21 which illustrates a schematic electrical and hydraulic unit for the apparatus there is shown diagrammatically the conveyors 40 and 41 driven by the hydraulic motors 52 and 54, and actuated vertically by the hydraulic cylinders 73 as explained above. The carriage shifting cylinder 91 is also schematically indicated in FIG. 21.

A hydraulic pressure source indicated generally at 148 includes a pump 149 driven by an electric motor 150, an oil reservoir 151 connected to the inlet of pump 149, and a fluid pressure gauge 152 connected to the outlet of pump 149. The pressure source 148 supplies hydraulic fluid under pressure as registered on the gauge 152 through a feed line 153 to the various hydraulic devices. A hydraulic line 154 returns fluid from the actuators to the reservoir 151.

A valve 155 is connected between the lines 153 and 154 and the drive motors 52 and 54 which are connected in series on line 156. A similar valve 157 is connected between the lines 153 and 154 and the cylinder 91. Valve 155 is a three-position solenoid operated four-way valve having a spring-centered blocked neutral position. Solenoids 190 and 191 which are operatively connected to valve 155 allow fluid to pass therethrough. Operation of solenoid 190 causes fluid to flow from motor 52 to motor 54 in line 156 and operation of solenoid 191 causes fluid to flow in the reverse direction, as indicated by the arrows in the valve 155. The fluid will flow only as long as one of solenoids 190 or 191 is energized. As can be seen, valve 155 will start, stop and reverse the hydraulic motors 52 and 54 by means of its three positions.

Connected in parallel with motors 52 and 54 on line 156 is a dual relief valve 158. The hydraulic motors 52 and 54 are connected in series with two restrictor valves 159 and 160, each of the latter being bypassed with check valves 161 and 162, respectively. The restrictor valves provide independent speed control of the hydraulic motors in each direction.

Since the hydraulic motors 52 and 54 are in series, the same amount of fluid will pass through each motor, and they will therefore run at synchronous speed. The belts can be set to receive a board moving at the same speed as the ripsaw conveyor by adjustment of restrictor valve 159, but allow return of the board to the operator at a faster speed by a higher setting of valve 160. The check valves 161 and 162 bypass fluid freely around the valves 159 and 160 respectively in one direction only, so that each of valves 159 and 160 is effective for fluid flow in only one direction.

The dual relief valve 158 comprises two adjustable relief valve components for relieving fluid from one portion of line 156 to the other. The valve 158 will thus allow flow therethrough in opposite directions at different selected pressures. The pressure settings can be independently adjusted. The function of valve 158 is to provide uniform and controlled deceleration of the belts and the board being handled. When the valve 155 drops into the neutral blocked position, the fluid in the hydraulic motor line 156 is trapped. Pressure immediately builds up due to the pumping action of the hydraulic motors from the momentum of the belts and board being handled. This pressure opens one component of relief valve 158, and fluid is allowed to circulate in the loop against the back pressure of the valve. This back pressure quickly reduces the rate of fluid flow, and the belts and their load decelerate and stop. The dual relief valve 158 should be set so that the heaviest board encountered is stopped while still between the grip of the upper and lower belts. The other component of relief valve 158 is used for shockless stopping of the empty belts after return of the board. The fluid then is allowed to circulate briefly in the other direction, as the belts are decelerated.

The speed of raising and lowering conveyors 40 and 41 is controlled by means of an adjustable restrictor valve 163 in a line 164 connected between the feed line 153 and a solenoid operated valve 165. A pressure level below the pressure of feed line 153 is maintained in a line 166 connected between the valve 165 and line 154 by bleeding a small amount of fluid constantly across from line 164 through a valve 167. The discharge from valve 167 passes through a relief valve 168 to the line 154. Valve 168 is set to open at the desired lower pressure. The lines designated 169 and 170 are connected between the solenoid operated valve 165 and the lower and upper cylinders 73 respectively. The two pressures thus obtained in the lines 164 and 166 are fed straight through or reversed in lines 169 and 170 by means of the solenoid operated valve 165. Valve 165 is a two-position four-way valve and is operated by a solenoid 171 which, when energized, holds the plunger of valve 165 to the left in the drawings to provide the unclamping action. When current to solenoid 171 is cut off, a spring returns the plunger of valve 165 to the right in the drawings to provide clamping action.

In this way, two different hydraulic pressures are alternately applied to the belt clamping cylinders 73 to achieve the required motion. Thus, to obtain the clamping action, the higher or system pressure is applied to the bottom cylinder, causing it to raise the bottom belt and the lower pressure is applied to the top cylinder. This lower pressure is adjusted to develop slightly less force than the weight of the top belt system, hence the top belt will drop, but will be hydraulically balanced so that only a small portion of its weight bears against the board. To obtain the unclamping action, the pressures are reversed by the valve 165, the higher pressure then applied to the top cylinder 73 will raise the top belt and the lower pressure applied to the bottom cylinder 73, since it creates less force than the weight of the bottom belt, will allow the bottom belt to drop.

The carriage shifting cylinder 91 is started, stopped and reversed by the three-position solenoid operated four-way valve 157 which is connected between lines 153 and 154 and the cylinder 91. The speed of operation of the cylinder 91 is controlled by restrictor valve 172, placed ahead of the four-way valve 157 in line 153. Valve 157 is operated by solenoids 173 and 174. Valve 157 is in the "off" position as shown in FIG. 21 when neither of solenoids 173 or 174 is operated. When solenoid 174 is actuated, fluid passes from line 153 through a line 175 connected between valve 157 and one end of cylinder 91. When solenoid 173 is actuated, fluid passes from line 153 through a line 176 connected between the valve 157 and the other end of cylinder 91.

The electric power circuit shown in FIG. 21 includes a suitable magnetic starter 177 of known construction equipped with remote start and stop push buttons 178 and 179, for controlling the electric motor 150 which drives the pump 149. A conventional three-phase 60 cycle 230 volt power source is used, but other voltages, phase, and cycle could be utilized if desired.

The electrical circuit used to operate the various solenoids takes its power from one leg of the power supply, on the controlled side of the starting switch through a transformer 180 which is used to reduce the voltage for example to 115 volts. The return connections from each of the solenoids is connected to terminal 181 of the transformer 180. The control current is fused at 182 and fed directly into the board sensing switch B which is also shown in FIG. 16 and includes terminals B1, B2, and B3. Contact is made from the terminal B3 to either of terminals B1 or B2.

Switches designated C, D, E, and F are limit switches mounted on the frame 32 of the machine so as to be actuated by the motion of the upper carriage 64 and specifically by means of cams 183 and 184 which are affixied to the carriage and in the case of switch C by the side of the carriage itself, as shown in FIGS. 7 and 8. In these four switches, contact is made either between terminals designated 1 and 2 or between terminals 3 and 4 of any given switch as shown in FIG. 22 which shows the contact action of these four switches with respect to the carriage position.

The vertical axis in the table of FIG. 22 represents the possible positions of the carriages 64 and 66, the column designated "returning position" denoting the position of the carriage when the belts are returning a board or boards to the sawyer, columns designated "position 1" and "position 2" denoting the carriage position when the belts are receiving either one or two boards from the ripsaw, respectively. The columns designated "shift" position denotes travel required between these positions. The solid bars beneath the contact numbers indicate that those contacts are closed during the part of the carriage motion indicated at the left of the bar. It may be seen that switches C, D, and E are thrown one way or the other at all times. Switch F, however, has a neutral position feature so that at "position 1", neither sets of contacts is closed. Reference should be made to FIG. 22 in analyzing the operation of the control circuit of FIG. 21.

The switch designated G is a manually operable double pole double throw remote selector switch which enables the sawyer to select the return of either one or both boards. A terminal G5 of switch G contacts either common terminal G1 or G3 and terminal G6 contacts either G2 or G4. Terminals G5 and G6 are both wired to terminal B2.

A switch H wired between the fuse 182 and the solenoid 129 is a single pole single throw switch and is located at the sawyer's position. By means of switch H the sawyer can energize the feedout lock solenoid 129 thereby locking the switch B out of operation as described hereinabove. The other details of wiring of the various switches and solenoids is clearly shown in FIG. 21 and will therefore not be described in further detail herein. It is to be understood that the circuit shown and described is given by way of example only and that a number of variations will be apparent to those skilled in the art.

It may be observed that there are no relays required in the control circuit of the apparatus.

To explain the operation of the apparatus, it may be assumed that the conveyors are in the single return position (position 1) and ready to receive a board. Switch G would then be in position 1, and E1–E2 would be closed, as indicated by FIG. 22. Both contacts of switch F would be open. Switch B would be closed to the receive position, that is, terminal B3 would be in contact with terminal B2 thereof. Connection would be made through D1, F2 and F4, but since as shown in FIG. 22 none of these contacts is closed in position 1, no further connections will be made. Connection will, however, be made from B2 to D3 and E3, and since contact between terminals D3 and D4 is established in position 1, current will flow from D4 to the receive solenoid 190 connected to the valve 155, thereby causing the hydraulic valve 155 to operate the hydraulic motors 52 and 54 in the receiving direction. Since the unclamp solenoid 171 is not receiving current, the top and bottom belts will be in the clamped position.

As the front end of the board passes the switch B, no electrical action occurs, but the board sensing mechanism spring 124 of FIGS. 15–17 is depressed. When the trailing end of the board passes off the switch, it closes to contact B1, opening B2 and cutting off the hydraulic motors 52 and 54. The decelerating function of the dual relief valve 158 operates to slow and stop the board. Current also flows between terminals C3 and C4 (which are closed with the carriage in position 1) and into the shift-to-return solenoid 173, thereby causing the shift cylinder 91 to move the carriage toward the returning position. Although the contacts D1–D2 as well as F1–F2 are now closed, they are out of the circuit because the switch B is open. The shifting continues until switch C operates at the returning position, opening the circuit between C3–C4 stopping the shift, and closing contacts C1–C2, energizing the return solenoid 191 of valve 155 and starting the hydraulic motors 52 and 54 in the return direction.

The belts 48 annd 49 will thus return the board to the sawyer, and when the end of the board passes out of the belts and across the switch B as the board moves toward the sawyer, it will snap contact B3 to B2, taking switch C out of the circuit thus stopping the hydraulic motors 52 and 54 and energizing D3 and E3 and through terminals G1–G2, D1, F2, and F4. Of these, D1–D2 and F1–F2 are closed, as indicated by FIG. 22 with the carriage still in the returning position. Current will therefore flow from D2 to the unclamp solenoid 171, causing the belts to unclamp, and from F1 to the shift-to-receive solenoid 174, causing the shift cylinder to move the carriage back toward the receiving positions. When the carriages reaches position 1, D1–D2 and F1–F2 will both open, as shown in FIG. 22, thereby interrupting the above functions so that the belts will clamp and the carriage shift will cease. The springs associated with the hydraulic valves 157 and 165 will shift these valves as soon as the solenoids are de-energized. Upon the carriage reaching position 1, D3–D4 closes as shown in FIG. 22 and the hydraulic motors 52 and 54 are again started in the receiving direction. A complete cycle of returning a board from the single return position has now been described.

The double-return cycle is very similar. Switch E fulfills the same function as switch D in the single return operation, it being connected to the double return side of the selector switch G and cammed to fulfill its function at the double return position as shown in FIG. 22. Hence, if position 2 is selected at any time during the return of the board, the unclamp will continue and the hydraulic motors will not start until position 2 is reached by the carriage, as controlled by switch E. Since position 2 is the extreme position, the shift-to-receive solenoid 174 is directly connected to terminal G3 of the position selector switch G, so that the shift cylinder 91 extends its full length and remains under fluid pressure with the solenoid 174 remaining on. The hydraulic motors 52 and 54 will start as soon as the carriage reaches position 2, as controlled by E3–E4. After the board has passed between the belts 48 and 49 so that terminal B3 snaps to terminal B1, the operation is the same as already described for position 1 or single return, except that both the main board and trim board are gripped between the belts.

It is clear that many modifications may be made in a machine of this complexity, without departing from the essential features of my invention. One such modification is that for certain classes of work, the top conveyor and all of its related parts may be completely eliminated, and the machine will function with the bottom belt only. Another modification is that the belt pivoting feature may be eliminated for many classes of work, with either a one or a two belt machine. Another modification is that the bottom belt be fixed at the height of the ripsaw table, and that its elevating and dropping functions as described be eliminated for some applications. Another modification is that the top belt need not raise and drop on each cycle, but simply be set manually or otherwise at the correct thickness for the boards involved. Other modifications may be devised, such as the use of bars or V-ways rather than slide rods to bear and guide the shifting function, the use of scissors-type or other linkage to perform this function or the substitution of other sources of power for the hydraulic cylinders and hydraulic motors herein mentioned.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A board handling apparatus, comprising in combination, a frame, horizontally disposed conveyor means mounted on said frame, drive means operatively associated with said conveyor means, means for shifting said conveyor means laterally with respect to the path of movement of material through said conveyor means, said conveyor means being movable along a vertical axis with respect to said frame, tension rod means connected to said conveyor means, said tension rod means including a hook, said hook being adapted to engage a portion of said apparatus when said conveyor is lowered and engagement between said hook and said portion of said apparatus preventing upward movement of said conveyor means with respect to said frame, and a cam for releasing said hook from said portion of said apparatus.

2. A board handling apparatus for use in conjunction with a ripsaw or the like, comprising in combination, a frame, conveyor means for conveying said boards therethrough, reversible drive means operatively connected to said conveyor means, means connected to said drive means and responsive to the presence of a board at predetermined positions to control the operation of said drive means, said reversible drive means being adapted to drive said conveyor means to move material through said apparatus in a first direction away from said ripsaw and said drive means being reversible responsive to movement of material through said apparatus beyond a preselected position so as to drive said conveyor means in the opposite direction whereby said material is moved through said apparatus in a direction opposite said first direction, said conveyor means comprising upper and lower spaced apart cooperating conveyor assemblies adapted to grip a board therebetween, an upper and lower carriage mounted on said apparatus for sliding movement along axes extending laterally of the path of movement of said boards through said apparatus, said upper and lower conveyor assemblies being supported from said upper and lower carriages respectively and being pivotally connected thereto for swinging movement about a common vertical axis, and actuator means connected between the frame and carriages for simultaneously sliding said carriages and pivotal connections along said laterally extending axes whereby said conveyor assemblies will slide laterally with the carriages and at the same time swing horizontally about said pivotal connections when resistance is imposed upon the assemblies at one side of the vertical axis.

3. An apparatus according to claim 2 wherein first and second clamping means are connected between said upper and lower conveyor assemblies and said upper and lower carriages respectively and each such clamping means comprises a pair of concentric telescopically associated tubes and an actuator operatively connected between each pair of tubes to extend or retract one of said tubes relative to the other of said pair along a vertical axis.

4. A board handling apparatus, comprising in combination, a supporting frame in the form of a U, said supporting frame being provided with opposed horizontally disposed recesses extending inwardly from one side of said apparatus a portion of the distance to the opposite side of said apparatus, said recess forming an opening in said apparatus through which said board passes during operation of said apparatus, said recess dividing said frame into a base portion below said recess, a portion extending upwardly from said base on one side of said recess and a laterally extending top portion supported by said upwardly extending portion and upper conveyor assembly extending downwardly from said upper portion and supported therefrom, a cooperating lower conveyor assembly spaced from said upper conveyor assembly and supported from said base portion, extensible support members between each of said conveyor assemblies and said frame, said extensible support members being adapted to allow said conveyor assemblies to move upwardly and downwardly along a vertical axis, reversible drive means operatively connected to each of said conveyor assemblies for moving a board therebetween in opposite directions, and said conveyor assemblies being laterally shiftable with respect to the path of movement of material through said apparatus to move the board in one direction along one path and in a reverse direction along another path.

5. A board handling apparatus, comprising in combination, a frame, an upper and lower horizontally disposed spaced apart cooperating conveyor assembly, a plurality of horizontally disposed slide rods affixed to said frame perpendicular to the path of movement of said boards through said apparatus, at least two of said rods being secured at each end thereof to said frame above said conveyor means and at least two of said rods being secured at each end thereof to said frame below said conveyor means, an upper carriage slidably associated with said upper rods, said upper carriage including bearing means slidably mounted on said upper slide rods, a lower carriage slidably associated with said lower slide rods, said lower carriage including bearing means slidably mounted on said lower slide rods, a first member connecting said upper conveyor assembly and said upper carriage and a second member connecting said lower conveyor assembly and said lower carriage.

6. A board handling apparatus, comprising in combination, a frame, an upper and lower conveyor means mounted on said frame, drive means operatively connected to said upper and lower conveyor means, an upper and lower carriage slidably mounted on said frame for movement along an axis extending at right angles to the path of movement of material through said apparatus, an upper and lower telescoping clamp assembly connected between said upper carriage and said upper conveyor assembly and said lower carriage and said lower conveyor assembly respectively, each such clamp assembly comprising an outer vertically disposed tubular member affixed to one of said carriages, a bushing mounted concentrically within each of said tubular members and secured rigidly thereto, an inner vertically disposed tubular member telescopically mounted within said bushing, a second bushing affixed to said inner tubular member and slidable within said outer tubular member, a hydraulic actuator operatively connected between the tubular members and mounted concentrically within said tubular members, each of said inner tubular members being pivotally movable within said outer tubular member, one of said conveyor assemblies being secured to each of said inner tubular members whereby operation of said hydraulic actuators is adapted to cause said conveyor assemblies to move upwardly or downwardly on a vertical axis, and means supported upon said frame for shifting said conveyors laterally with respect to the path of movement of material through said apparatus whereby material can be transported by said conveyor along a plurality of laterally spaced apart paths.

7. An apparatus according to claim 6 wherein said means for shifting said conveyor means laterally comprises a pair of vertically spaced apart horizontally disposed frame arms, said frame arms being pivotally connected at one end thereof to said frame for movement about a vertical axis, a second pair of vertically spaced apart horizontally disposed frame arms, one end of said second pair being pivotally connected to the other end of said first pair of frame arms and the other end of said second pair of frame arms being pivotally connected to said upper and lower carriages, a hydraulic actuator pivotally connected at one end to said frame and including an actuator rod operatively connected to said first pair of frame arms, operation of said actuator being adapted to extend and retract said frame arms to slide said carriages laterally in said apparatus.

8. A board handling apparatus, comprising in combination, a frame, upper and lower clamp assemblies mounted on said apparatus, each such clamp assembly including an inner and outer vertically disposed clamp tube, a conveyor frame member secured to the free end of each of said inner clamp tubes, each such inner clamp tube and each of said conveyor frame members being pivotable about a vertical axis relative to said frame, first and second spring means for yieldably retaining each of said conveyor frame members in a selected position on said vertical axis, each such spring comprising a vertically disposed leaf spring secured at an intermediate point thereof to said outer clamp tube, a slide block secured to each end of each such spring, a pair of slide face members secured to said conveyor frame members, said slide blocks being adapted to engage said slide face members, the portion of each of said springs on one side of said intermediate point comprising a relatively long spring adapted to yieldably bias one of said conveyor frame members toward said selected position and the other portion of said spring comprising a relatvely short stiff spring adapted to serve as a bumper for said conveyor frame member as said conveyor frame member returns to said selected position.

9. A board handling apparatus, comprising in combination, a frame, a horizontally disposed conveyor assembly mounted on said frame, means supported upon said frame for shifting said conveyor assembly laterally of the path of movement of material through said apparatus whereby material can be transported by said conveyor assembly along a plurality of laterally spaced apart paths, drive means operatively connected to said conveyor assembly, said conveyor assembly comprising a horizontally disposed conveyor frame member, said conveyor frame member including a slide and an idler pulley assembly slidably mounted on said slide, a horizontally disposed pulley rotatably mounted on said conveyor frame member at one end thereof, a horizontally disposed idler pulley rotatably mounted on said idler pulley assembly, a conveyor belt entrained over said pulleys, said idler pulley assembly being slidable in said slide along an axis extending between said pulleys to allow said pulleys to be moved together or apart to adjust the tension of said belt, an adjustment screw connected between said conveyor frame member and said idler pulley assembly to adjust the distance between said pulleys, means to securely lock the idler pulley assembly in a selected position with respect to said conveyor frame member, a tubular support member affixed to and extending laterally of said idler pulley assembly, a self-aligning ball bearing affixed to the free end of said tubular support member, a shaft rotatably mounted within said self-aligning ball bearing assembly, said idler pulley being secured to one end of said shaft, a second self-aligning ball bearing connected to the other end of said shaft, said second self-aligning bearing being slidably mounted on said idler pulley assembly for movement along a horizontal axis, and an adjustment screw connected between said second self-aligning bearing and said idler pulley assembly to move the second self-aligning bearing longitudinally of the conveyor assembly whereby said shaft is pivoted about a vertical axis to adjust the tracking of said belt.

10. A board handling apparatus, comprising in combination, a frame, a conveyor means mounted on said frame, drive means operatively connected to said conveyor means, means supported upon said frame for shifting said conveyor laterally with respect to the path of movement of material through said apparatus, a vertically disposed pivotal connection between said conveyor means and said frame, said conveyor means being thereby adapted to pivot about a vertical axis with respect to said frame, said conveyor means comprising upper nd lower opposed conveyor assemblies each having such pivotal connection with the frame, each such pivotal connection including a pair of vertically disposed concentric tubes, and a fluid operated actuator means operatively connected between the tubes in each pair and therewithin to telescopically slide the tubes in each pair for thereby adjusting said conveyor assemblies relative to each other.

11. In a board handling and conveying apparatus for receiving a board delivered endwise from a board cutting machine, a frame, an elongated horizontally extending conveyor means mounted on the frame and adapted to be positioned adjacent to the machine to receive and deliver a board longitudinally therealong, a reversible drive means on the frame operatively connected to the conveyor means for driving the conveyor means in opposite longitudinal directions, the mounting of the conveyor means on the frame including an upright pivot shaft allowing the conveyor means to swing on the shaft axis, said shaft being movable on the frame in a direction which is transverse with respect to the conveyor means extension, and shifting means supported by the frame and operatively connected to the shaft to move the shaft in such transverse direction allowing the conveyor means to swing about the shaft axis when resistance is imposed thereon between a first position delivering the board in one direction and a second position delivering the board in a reverse direction.

12. An apparatus according to claim 11 having a switching device mounted on the conveyor means which is responsive to the trailing end of a board moved therepast to actuate said shifting means and reverse said motor whereby after a board has been delivered along said conveyor means past said device it will be returned along the shifted conveyor means.

13. An apparatus according to claim 11 wherein said conveyor means comprises upper and lower spaced apart cooperating conveyors, the mounting of the upper conveyor including means for vertical adjustment thereof for varying the spacing between the conveyors.

14. An apparatus according to claim 13 wherein the upper conveyor has its board receiving end portion extending lengthwise beyond the corresponding portion of the lower conveyor whereby a board delivered from the machine will be engaged by the upper conveyor prior to the engagement by the lower conveyor.

References Cited by the Examiner

UNITED STATES PATENTS

| | | | |
|---|---|---|---|
| 499,460 | 6/93 | Hooper | 144—242 |
| 865,124 | 9/07 | Rice. | |
| 985,992 | 3/11 | Fiebach et al. | |
| 1,454,809 | 5/23 | Boos. | |
| 1,527,064 | 2/25 | Osgood. | |
| 1,529,806 | 3/25 | Dettel | 143—49 |
| 1,570,484 | 1/26 | Hanson. | |
| 1,600,656 | 9/26 | Thaxton. | |
| 1,833,470 | 11/31 | Olson | 143—49 |
| 1,898,551 | 2/33 | MacCutcheon | 198—127 |
| 2,262,325 | 11/41 | Kendall. | |
| 2,507,644 | 5/50 | Peters | 144—3.1 |
| 2,595,879 | 5/52 | Pasquier | 143—47 |
| 2,664,123 | 12/53 | Arvidson | 143—49 |
| 2,675,118 | 4/54 | Morrison. | |
| 2,803,273 | 8/57 | Ramsey et al. | 143—37 |
| 2,829,683 | 4/58 | Skinner et al. | 143—92XR |
| 2,830,629 | 4/58 | Deiters. | |
| 2,848,100 | 8/58 | Jasper | 144—242 |
| 2,859,780 | 11/58 | Carlson. | |

LESTER M. SWINGLE, *Primary Examiner.*

MORRIS M. FRITZ, WILLIAM W. DYER, JR.,
*Examiners.*